July 25, 1939. A. LEUFVÉN 2,167,457
BEARING HOUSING SUPPORT
Filed Sept. 11, 1937 3 Sheets-Sheet 1
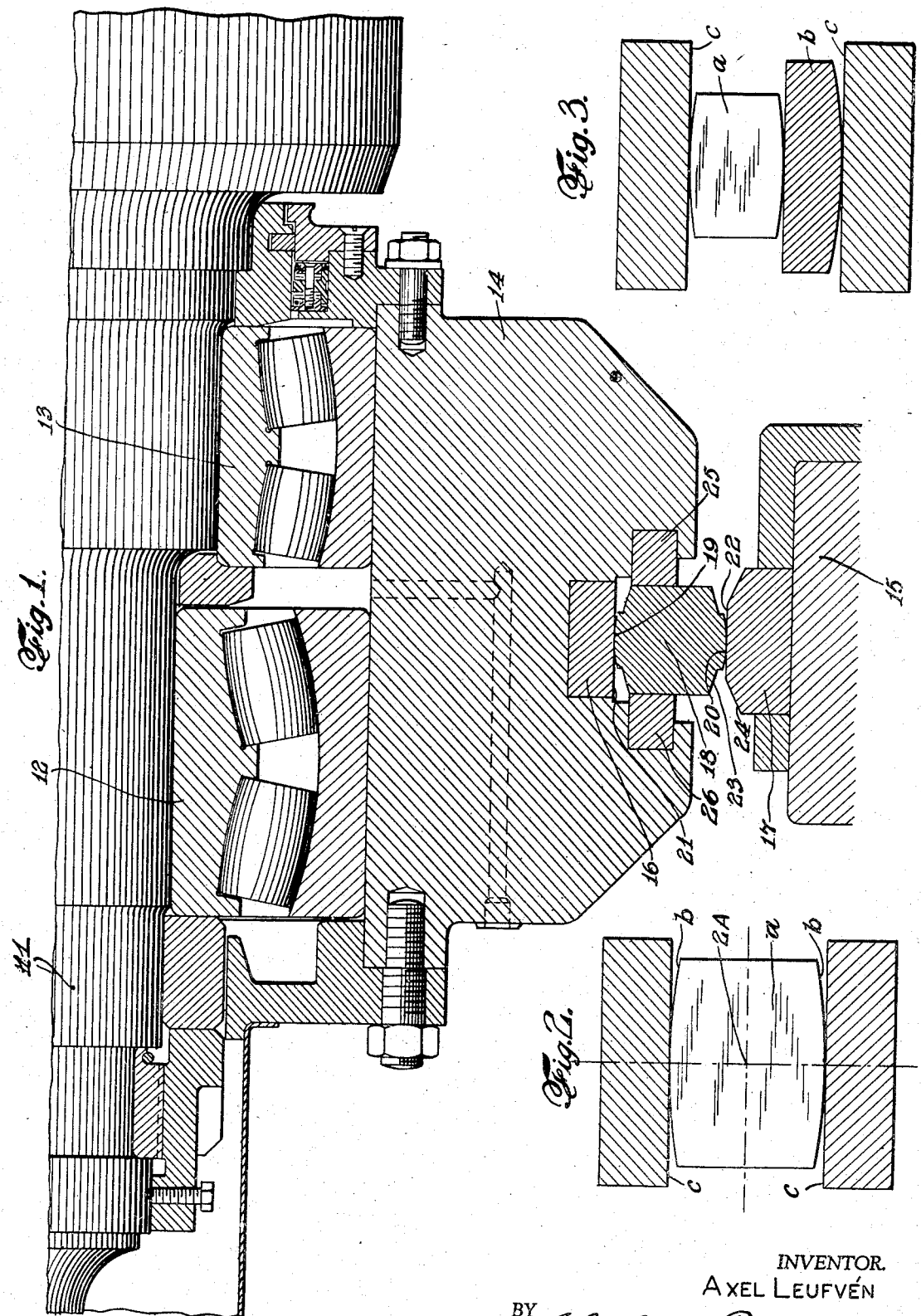
INVENTOR.
AXEL LEUFVÉN
BY
ATTORNEY July 25, 1939.    A. LEUFVÉN    2,167,457
BEARING HOUSING SUPPORT
Filed Sept. 11, 1937    3 Sheets-Sheet 2

INVENTOR.
AXEL LEUFVÉN
BY Chas. Lyon Russell
his ATTORNEY.

July 25, 1939.  A. LEUFVÉN  2,167,457
BEARING HOUSING SUPPORT
Filed Sept. 11, 1937  3 Sheets-Sheet 3

INVENTOR.
AXEL LEUFVÉN
BY
ATTORNEY.

Patented July 25, 1939

2,167,457

UNITED STATES PATENT OFFICE 2,167,457

BEARING HOUSING SUPPORT

Axel Leufvén, Schweinfurt, Germany, assignor to Aktiebolaget Svenska Kullagerfabriken, Goteborg, Sweden, a corporation of Sweden Application September 11, 1937, Serial No. 163,367
In Germany September 15, 1936

8 Claims. (Cl. 308—207)

This invention relates to supports for bearing housings and has for one of its objects to place a rolling or rocking body between a surface of the housing and some other fixed surface, under line or point contact, the surface of such body conforming to the surfaces which it engages more closely than would a round roller of equal height engage two plane surfaces.

In bearing housings which are subjected to automatic axial adjustments or shifting (for instance through heat expansion) or to tilting movement (for instance through bending of the shaft) it is known to support the housings in such a manner that they can align themselves to such movements. This has been accomplished by providing a spherical or ridge-shaped surface and a plane or spherical surface respectively at the point of abutment between housing and support. When a housing of such a design shifts, considerable sliding friction occurs between the two surfaces which has to be overcome. It has been found that the bending moments caused by this friction can be of such magnitude that the bearing may become overloaded. The application of a single ball or roller for supporting the housing is not feasible in the case of bearing housing of heavy type, as the specific surface pressure along the line of contact or at the contact point is very great owing to the small degree of conformity between the contacting surfaces. It is therefore desired to provide a support which will permit an axial movement as well as a tilting movement of the housing, without causing sliding friction and without making necessary a substantial increase in height.

These objects are attained through the present invention. The housing is supported by means of a body rolling under line or point contact between fixed surfaces. The contacting surfaces are also made to conform to each other to a greater degree than is the case, when a rolling ball or roller, the diameter of which is equal to the height of the body, is used in connection with plane surfaces. The height of the body can therefore be maintained very inconsiderable, since the specific surface pressure at the contact point will be relatively small. If a ball or roller were located between the fixed bearing surfaces, then the ball or roller, in order to maintain the same specific pressure at the contact point, must have much greater diameter, which would increase the height of the mounting to an impracticable degree. The body now permits axial movement as well as a tilting movement of the housing while eliminating sliding friction. The space requirement will hardly be greater than if ridge-shaped or spherical sliding surfaces are provided. When the housing is shifted axially or tilted, a slight movement perpendicular to the bearing axis occurs. However, since this movement can be exactly predetermined it is possible to arrange the mounting of the body in such a manner, that the desired positioning of the housing when mounted is obtained. In this case it is preferable to maintain the body in a somewhat oblique position by providing wedges of appropriate form at each side of the body. The wedges can subsequently be removed and when complete heat expansion of the shaft has taken place the body will remain positioned exactly underneath the housing. The upper and lower surfaces of the body can be of cylindrical, spherical or the like form. The fixed surfaces, against which the body abuts, may be plane, cylindrical or spherical.

The invention is illustrated in the accompanying drawings; in which

Figure 1 is a section showing a portion of the lower part of a bearing housing, the section being taken on a plane axial of the journal and vertically disposed, this figure showing the lower part of the roller bearing mounted in the housing, and showing also in the same section as the rest of the figure, my improved supporting device.

Figure 2 shows the supporting body provided with convex contact surfaces, the body rolling between two fixed plane surfaces, the line of rolling being perpendicular to the plane of the paper and being represented by the point "2A".

Figure 3 shows a somewhat similar form of construction, there being a plano-convex body interposed between the supporting body and the plane fixed surface.

Figure 4:
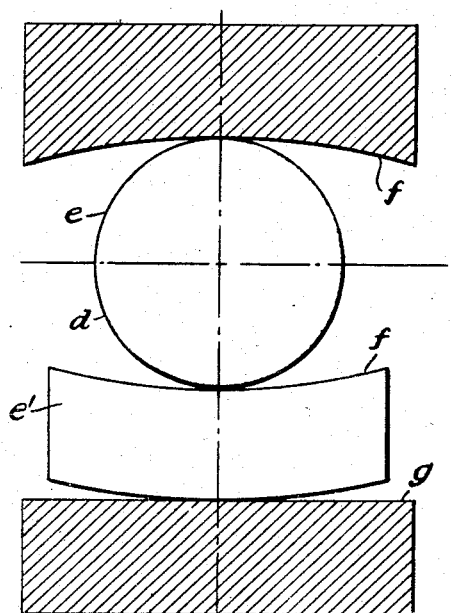
Figure 4 shows the supporting body of cylindrical form rolling upon a concavo-convex member interposed between the lower part of such body and the fixed surface.

In Figure 1 of the drawings I have represented my invention in a preferred form for supporting a journal, a broken away portion of which is indicated by the reference character 11. Two roller bearings 12 and 13 are shown mounted on the journal and located within the bearing housing 14, my supporting device being shown at the bottom of this housing, and deriving its ultimate support from a fixed frame member 15. A hardened plate 16 is inserted in the lower part of the bearing housing 14 and a similar plate 17 is secured to the upper part of the frame member 15.

The supporting body 18 has an upper and a lower convex surface 19—20, for rolling upon the fixed plane surfaces 21—22 of the plates 16 and 17. These convex surfaces run longitudinally of the body 18. To permit free rocking, or rather to prevent interference with the rocking the sides of the supporting body 18 at the sides of the convex surfaces may be relieved as at 23. For similar reasons the plate 17 may be relieved as at 24.

Figure 8:
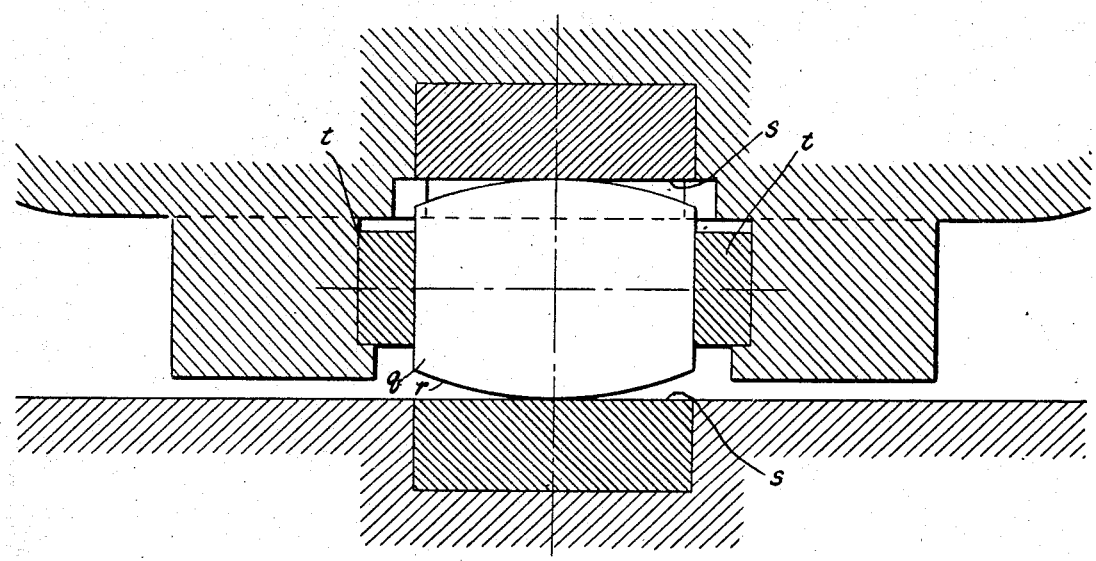
Figure 8 is a view taken of about the same plane as the lower portion of Figure 1 and represents the mounting of the form of supporting body shown in Figure 2, and also shows the application of the wedges for maintaining the body in position during mounting.
Figure 9:
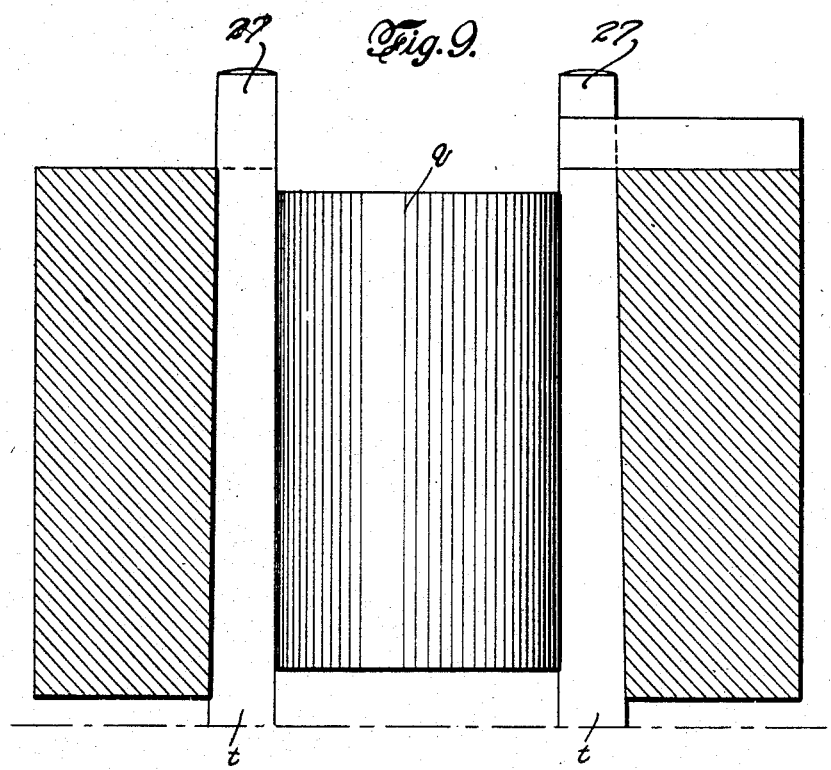
Figure 9 is a top view showing the supporting body and the wedges.

In originally mounting the device it has been found desirable to hold the body 18 securely in position. It is preferably provided with plane ends which are engaged by suitable wedges 25—26. Recesses are shown provided in the lower part of housing 24 for these wedges. Further details of the wedges are illustrated in Figures 8 and 9 of the drawings. After the machine has been set up the wedges may be readily driven out by striking the smaller and protruding ends 27, see Figure 9.

Various changes may be made in the form of supporting body and of fixed surfaces upon which it rolls.

Figure 7:
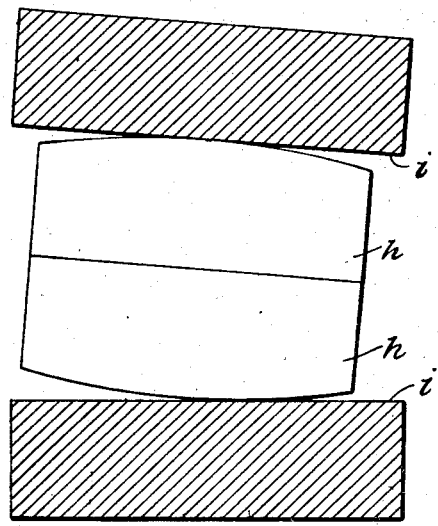
Figure 7 shows a body composed of two parts which lie with plane surfaces on each other and are convexly curved on the upper and lower surface, the fixed surfaces being plane.

Some of these forms are illustrated in the drawings and may to advantage be described at this point. Before doing so, however, I wish to state that cases may occur in practice where it is desirable to provide a body consisting of several parts. This may be done in such a manner that an equally advantageous means of support is obtained as in the case of a body according to the system previously described, if the curve and the degree of conformity is chosen just in a similar manner. Figures 3, 4 and 7 of the drawings showing embodiments of bodies composed of several parts.

Figure 2 shows the body $a$ provided with convex contact surfaces $b$. The body rolls between two fixed plane surfaces $c$.

Figure 3 is a body composed of the parts $a$ and $b$. The fixed surfaces $c$ are plane. The body $b$ is also plane on the upper side.

Figure 4 shows a body $d$ of cylindrical form. The cylindrical surface $e$ can roll on the concave fixed surfaces $f$. This view also shows the supporting body as being composed of a cylindrical or ball-shaped part $d$ and a part $e$, the upper surface of which is concave and the lower surface convex. The fixed surface $f$ is concavely curved, the fixed surface $g$ is plane.

Figure 5:
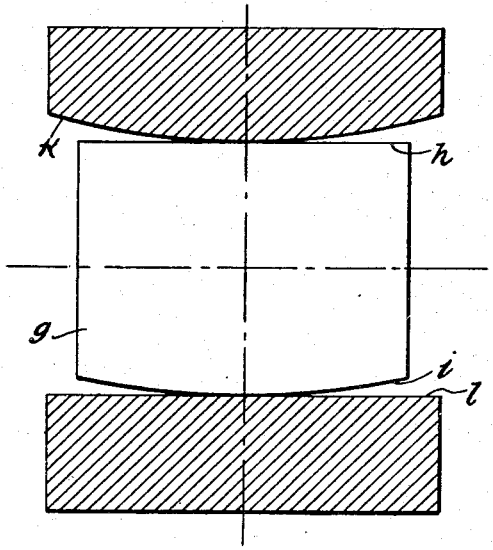
Figure 5 shows the supporting body formed on its upper part with a plane surface and its lower part with a convex, the upper surface being in contact with a convex surface and the lower surface with a fixed plane surface.

Figure 5 shows a body $g$, the upper surface $h$ of which is plane and the lower surface of which is convex. The top surface $h$ rolls on the fixed convex surface $k$, and the convex lower surface $i$ rolls on the fixed plane surface $l$.

Figure 6:
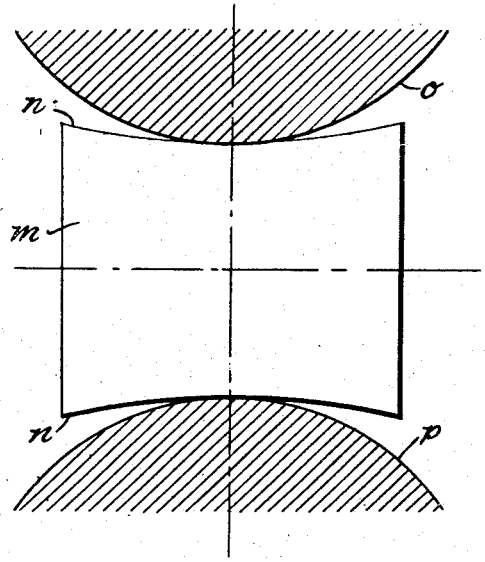
Figure 6 shows the supporting body formed with upper and lower concave surfaces which roll on fixed convex surfaces.

Figure 6 shows a body $m$, the upper and lower surfaces $n$ of which are concave. They roll on fixed convex surfaces $o$ and $p$.

Figure 7 shows a body composed of the parts $h$. The two parts lie with plane surfaces on each other and are convexly curved on the upper and lower surface, the fixed surfaces are plane.

Figure 8 shows a body $q$ and its convex surfaces $r$ roll between the fixed plane surfaces $s$. When being mounted, the body is first maintained in desired position by means of the wedges $t$. The latter are subsequently removed.

Figure 9 shows the form of the wedges 6.

Having thus described my invention I claim and desire to secure by Letters Patent:

1. A bearing housing support of the kind specified, comprising a single body situated between a surface on the housing and a surface on a supporting member and arranged to support the load on the bearing, in which both of the pair of contacting surfaces are relatively curved to provide a single line of contact between the body and the housing, and the body and the supporting member, so as to allow tilting and axial displacement of the bearing housing, and the conformity of the curvatures between the two surfaces of each pair is closer than that of a plane surface in contact with a ball or roller of the same height as the body.

2. A bearing housing support according to claim 1, characterized thereby that the upper and lower surfaces of the body are convexly curved and that the fixed surfaces are plane.

3. A bearing housing support according to claim 1, characterized thereby that the upper and lower surfaces of the body are convexly curved and that at least one of the fixed surfaces is concavely curved.

4. A bearing housing support according to claim 1, characterized thereby that one surface of the body is convexly curved and the other plane, whereby the plane surface abuts against a convexly curved and fixed surface and the convexly curved surface abuts against a plane fixed surface.

5. A bearing housing support according to claim 1, characterized thereby that both the surfaces of the body are concavely curved and that both the fixed surfaces are convexly curved.

6. A bearing housing support according to claim 1, characterized thereby that one surface of the body is concavely curved and the other plane, whereby the concavely curved surface abuts against a convexly curved fixed surface and the plane surface also abuts against a convexly curved fixed surface.

7. A bearing housing support according to claim 1, characterized thereby that the body when being mounted is maintained in place by means of suitable removable wedges.

8. A bearing housing support wherein the supporting body is provided with curved surfaces and is composed of several parts.

AXEL LEUFVÉN.